United States Patent
Letkeman

(10) Patent No.: US 9,768,532 B1
(45) Date of Patent: Sep. 19, 2017

(54) IRRIGATION SYSTEM GROUNDING STRAP

(71) Applicant: Billy Letkeman, Seminole, TX (US)

(72) Inventor: Billy Letkeman, Seminole, TX (US)

( * ) Notice: Subject to any disclaimer, the term of this patent is extended or adjusted under 35 U.S.C. 154(b) by 0 days.

(21) Appl. No.: 15/272,750

(22) Filed: Sep. 22, 2016

(51) Int. Cl.
*H01R 4/66* (2006.01)
*A01G 25/09* (2006.01)

(52) U.S. Cl.
CPC ............. *H01R 4/66* (2013.01); *A01G 25/092* (2013.01)

(58) Field of Classification Search
CPC ........ H02G 13/00; H02G 13/20; H02G 13/40; H02G 13/80; H02G 5/02; H01R 4/66; H01R 4/643; H01R 4/42; H01R 4/646; A01G 25/092
USPC ........... 174/135, 61, 7, 40 CC, 51, 1, 5 R, 2, 174/5 SG, 6; 361/212, 216, 222; 439/95, 439/100
See application file for complete search history.

(56) References Cited

U.S. PATENT DOCUMENTS

| | | | |
|---|---|---|---|
| 4,398,277 A | 8/1983 | Christiansen et al. | |
| 4,577,256 A | 3/1986 | Breidegam | |
| D289,999 S | 5/1987 | Frazier | |
| 4,664,469 A * | 5/1987 | Sachs | H01R 4/643 439/100 |
| 4,698,724 A | 10/1987 | Burvee | |
| 5,131,856 A * | 7/1992 | Auclair | H01R 4/643 24/280 |
| 5,314,343 A * | 5/1994 | Englander | H01R 4/643 439/100 |
| 6,215,639 B1 | 4/2001 | Hee | |
| 6,398,596 B1 * | 6/2002 | Malin | H01R 4/42 439/100 |
| 6,559,387 B1 * | 5/2003 | Franks | H01R 4/643 174/135 |
| 6,727,430 B1 * | 4/2004 | Franks, Jr. | H01R 4/643 174/135 |
| 6,735,070 B2 | 5/2004 | Antila | |
| 6,933,442 B2 * | 8/2005 | Franks, Jr. | H01R 4/643 174/135 |
| 6,943,299 B1 * | 9/2005 | Daume | H01R 4/643 174/78 |
| 7,122,739 B2 * | 10/2006 | Franks, Jr. | H01R 4/643 174/136 |

* cited by examiner

*Primary Examiner* — Angel R Estrada
(74) *Attorney, Agent, or Firm* — Stevenson IP, LLC

(57) ABSTRACT

An irrigation system grounding strap including an adjustable lap-joint band clamp attachable to a wheel support lateral member of an irrigation system end tower with a flat braided copper wire strap having one end attached to the band clamp and an opposite end having a ground body, such as a flat washer, attached thereto that makes ground contact when the irrigation system is operating to dissipate electrical charges produced by a short circuit in the electric drive motor on a lateral wheel support member of an end tower of the irrigation system.

3 Claims, 5 Drawing Sheets

IRRIGATION SYSTEM GROUNDING STRAP

BACKGROUND OF THE INVENTION

Various types of electrically conductive articles for dissipating an electrical charge are known in the prior art. However, what is needed is an irrigation system grounding strap which includes an adjustable lap-joint band clamp attachable to a wheel support lateral member of an irrigation system end tower with a flat braided copper wire strap having one end attached to the band clamp and an opposite end having a discharge article, such as a flat washer, attached thereto that makes ground contact when the irrigation system is operating to dissipate electrical charges produced by a short circuit in the end tower electric drive motor.

FIELD OF THE INVENTION

The present invention relates to grounding articles for dissipating an electrical charge, and more particularly, to an irrigation system grounding strap.

SUMMARY OF THE INVENTION

The general purpose of the present irrigation system grounding strap, described subsequently in greater detail, is to provide an irrigation system grounding strap which has many novel features that result in an irrigation system grounding strap which is not anticipated, rendered obvious, suggested, or even implied by prior art, either alone or in combination thereof.

To accomplish this, the present irrigation system grounding strap is devised to ground an electric drive motor on a wheel support lateral member of an irrigation system end tower to prevent electrical shock and possible electrocution in the event of a short circuit in the electric drive motor. The irrigation system grounding strap includes a length-adjustable lap-joint band clamp configured to removably attach to the lateral wheel support member of the end tower of the center pivot irrigation system and having top and bottom sides, an outer wall, and a pair of spaced apart outer loops on a front end of the outer wall. Each of the pair of outer loops has an opening extending from the top side to the bottom side. A pair of holder members is provided with one of the pair of holder members being continuously disposed through the opening of each of the outer loops. A first holder member of the pair of holder members is hour-glass shaped holder and has an aperture transversely centrally disposed therethrough. A second holder member of the pair of holder members has an end cap disposed thereon. A single adjustment screw is insertable through the aperture of the first holder member and has an external end securable within the end cap. A nut engages the adjustment screw and is provided to tighten and loosen the adjustment screw relative the first holder member to shorten and alternately lengthen a distance between the holder members. Shortening and alternately lengthening the distance between the holder members, decreases and alternately increases a diameter of the lap-joint band clamp to secure the lap-joint band clamp to a lateral wheel support member of an end tower of a center pivot irrigation system.

A flat braided copper wire strap is provided as an electrical conductor and has an upper loop slidingly engaging the lap-joint band clamp outer wall and a lower loop having a ground body, such as a flat annular washer, disposed thereon. The strap has a length between the lap-joint band clamp on the lateral wheel support member and the ground body sufficient to permit the ground body to make contact with a ground surface on which the ground body is disposed. The ground body is configured to discharge an electric charge from a short-circuited electric end tower drive motor disposed on the lateral wheel support member of an end tower of a center pivot irrigation system. Thus has been broadly outlined the more important features of the present irrigation system grounding strap so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
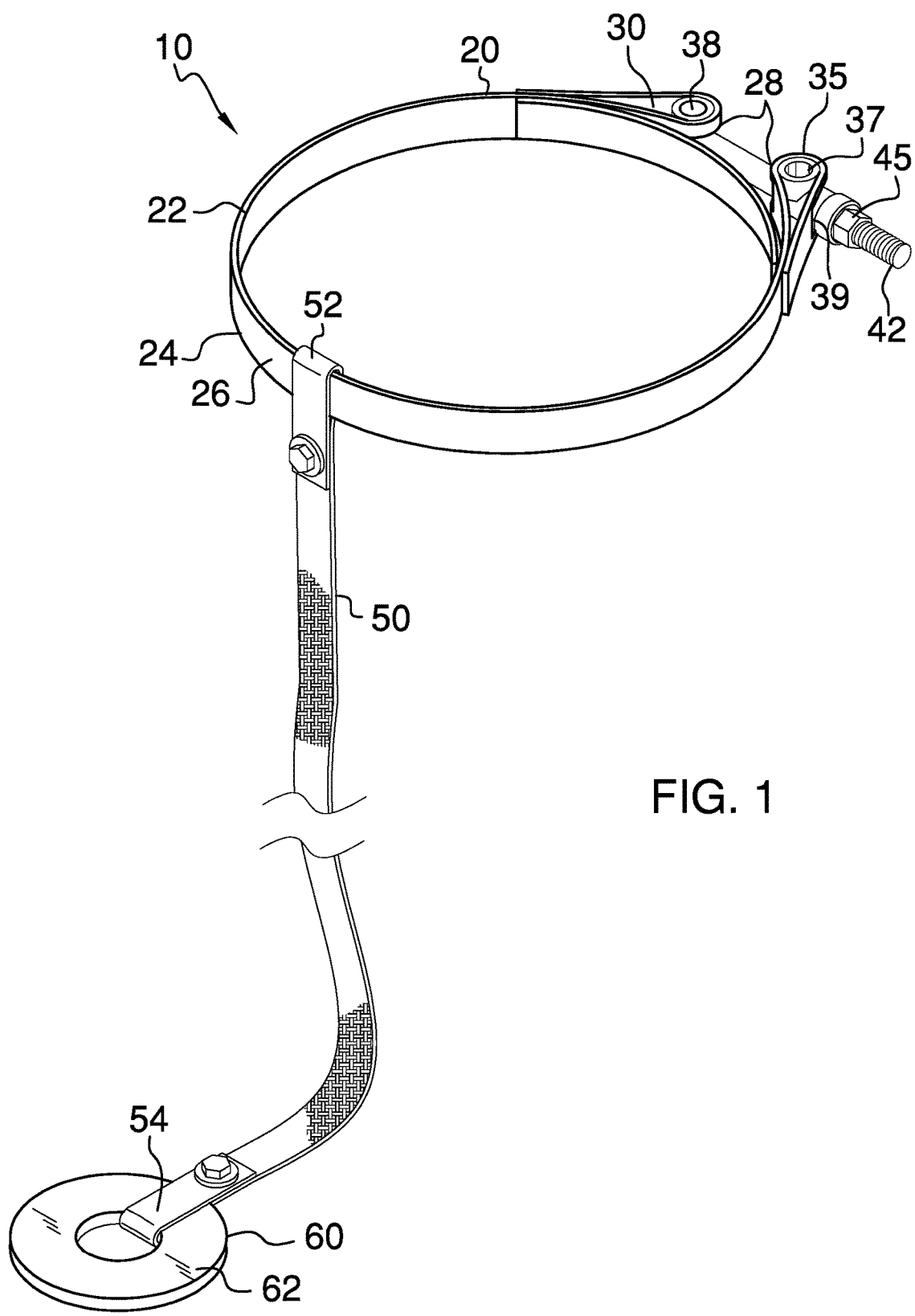
FIG. 1 is an isometric view.
Figure 2:
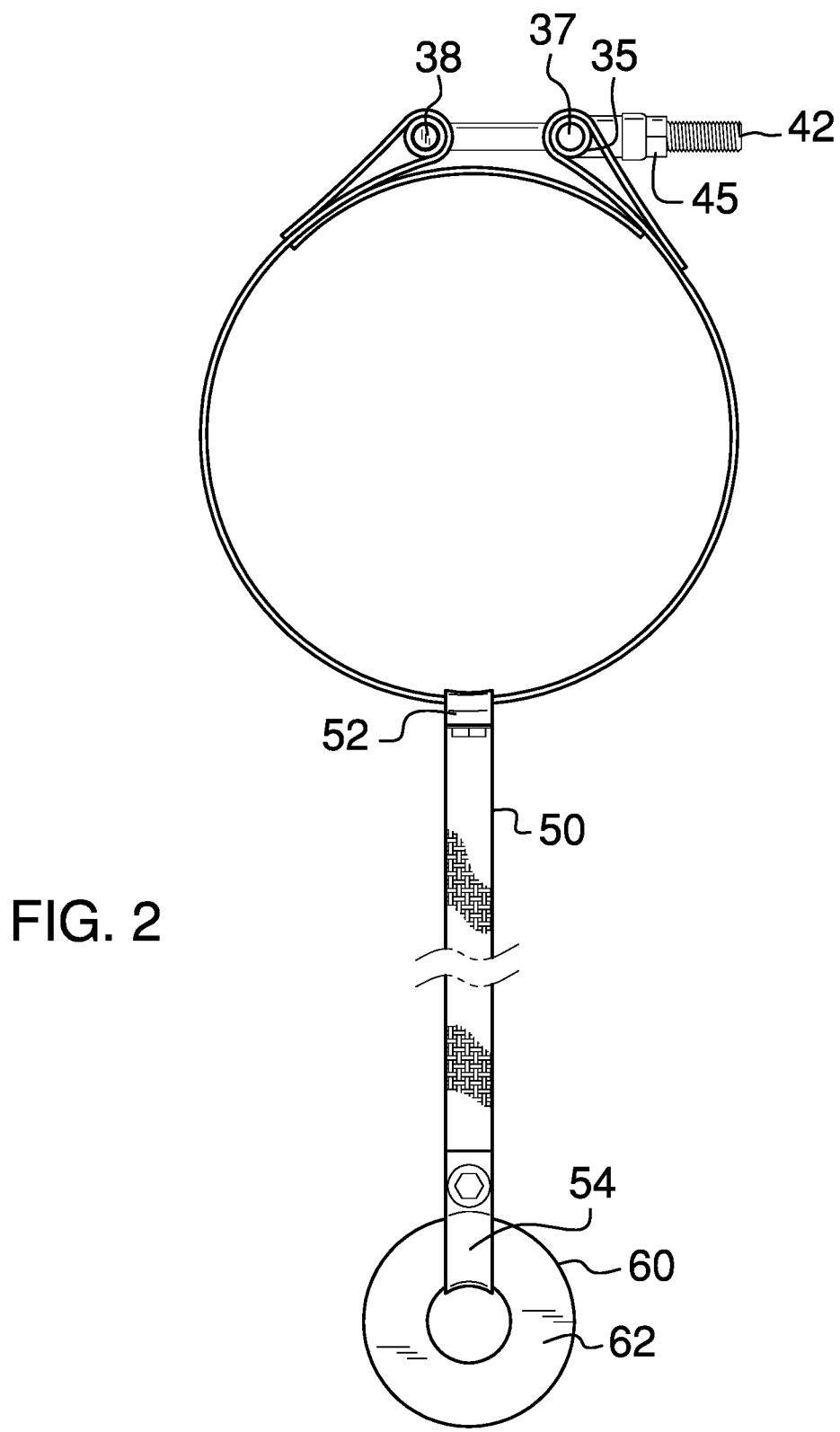
FIG. 2 is a top plan view.
Figure 3:
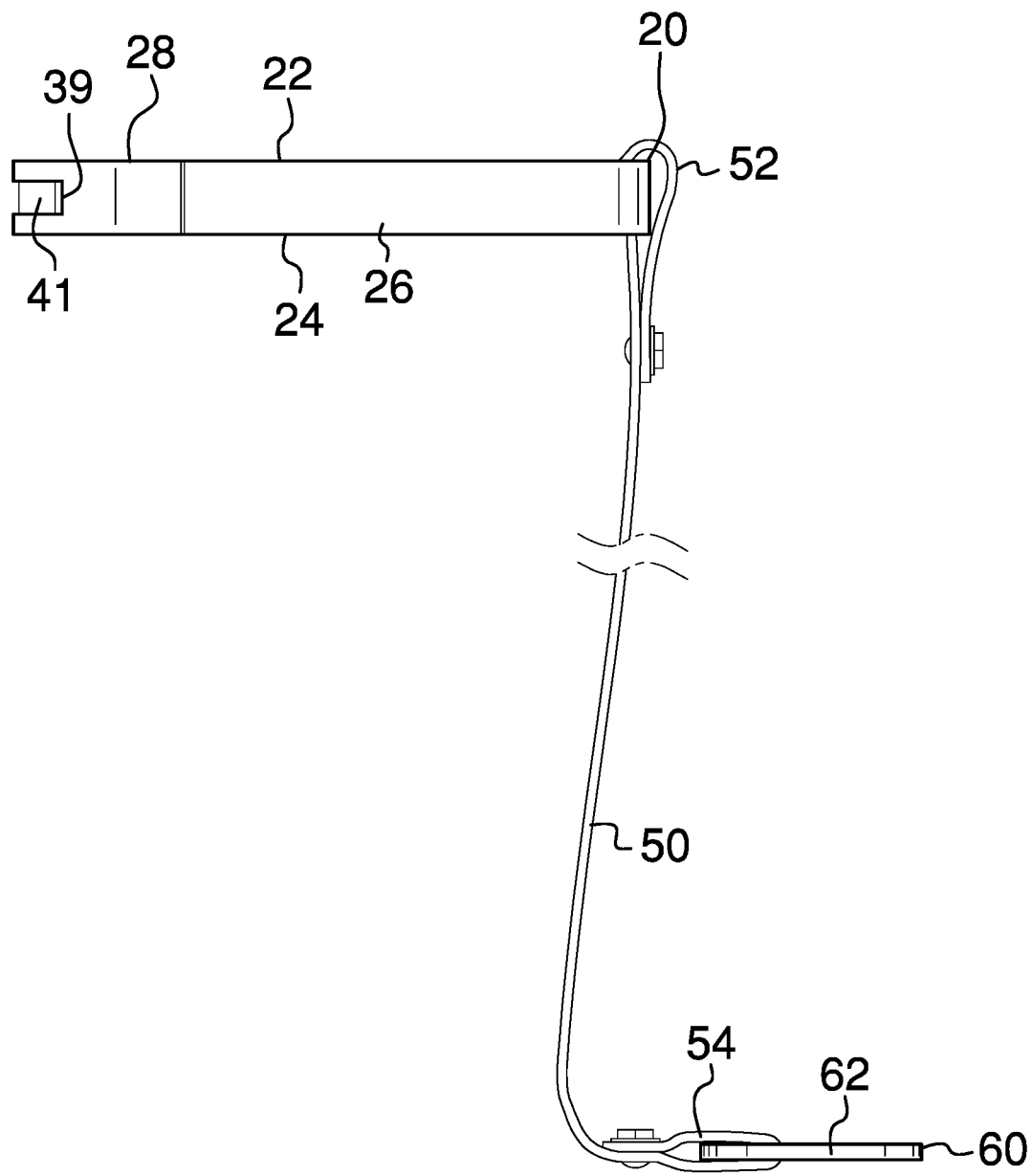
FIG. 3 is a side elevation view.
Figure 4:
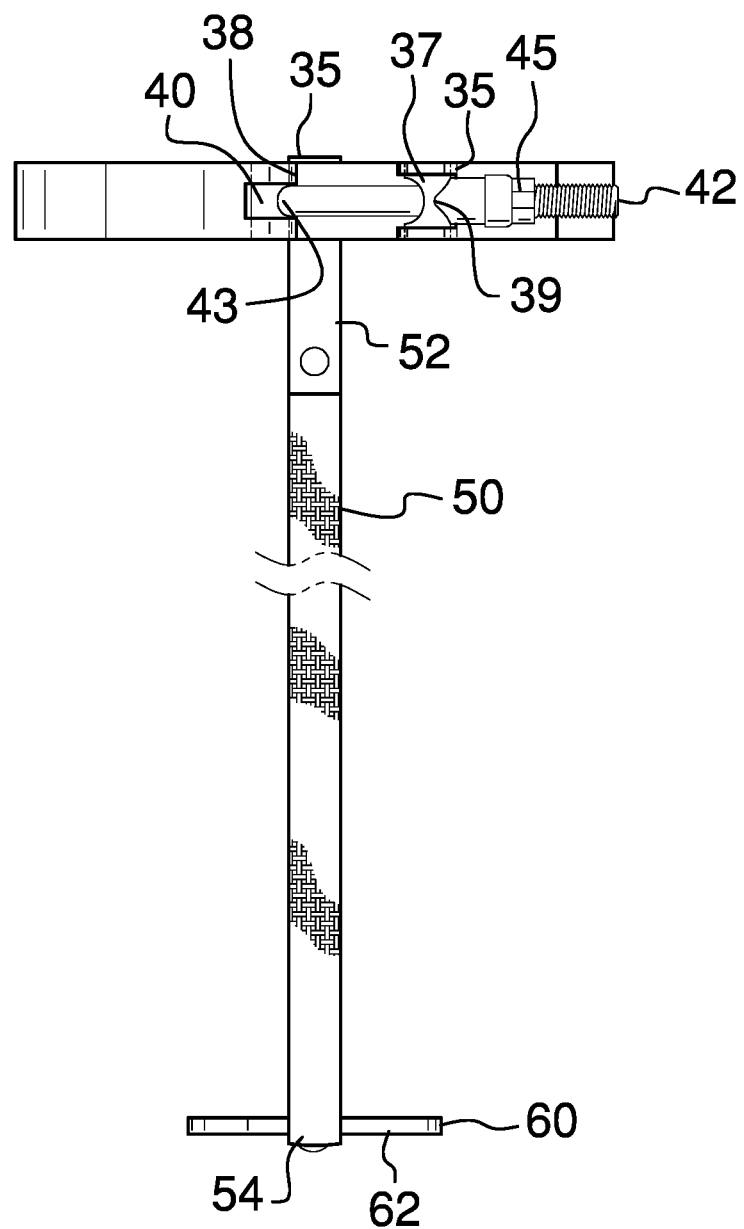
FIG. 4 is a front elevation view.
Figure 5:
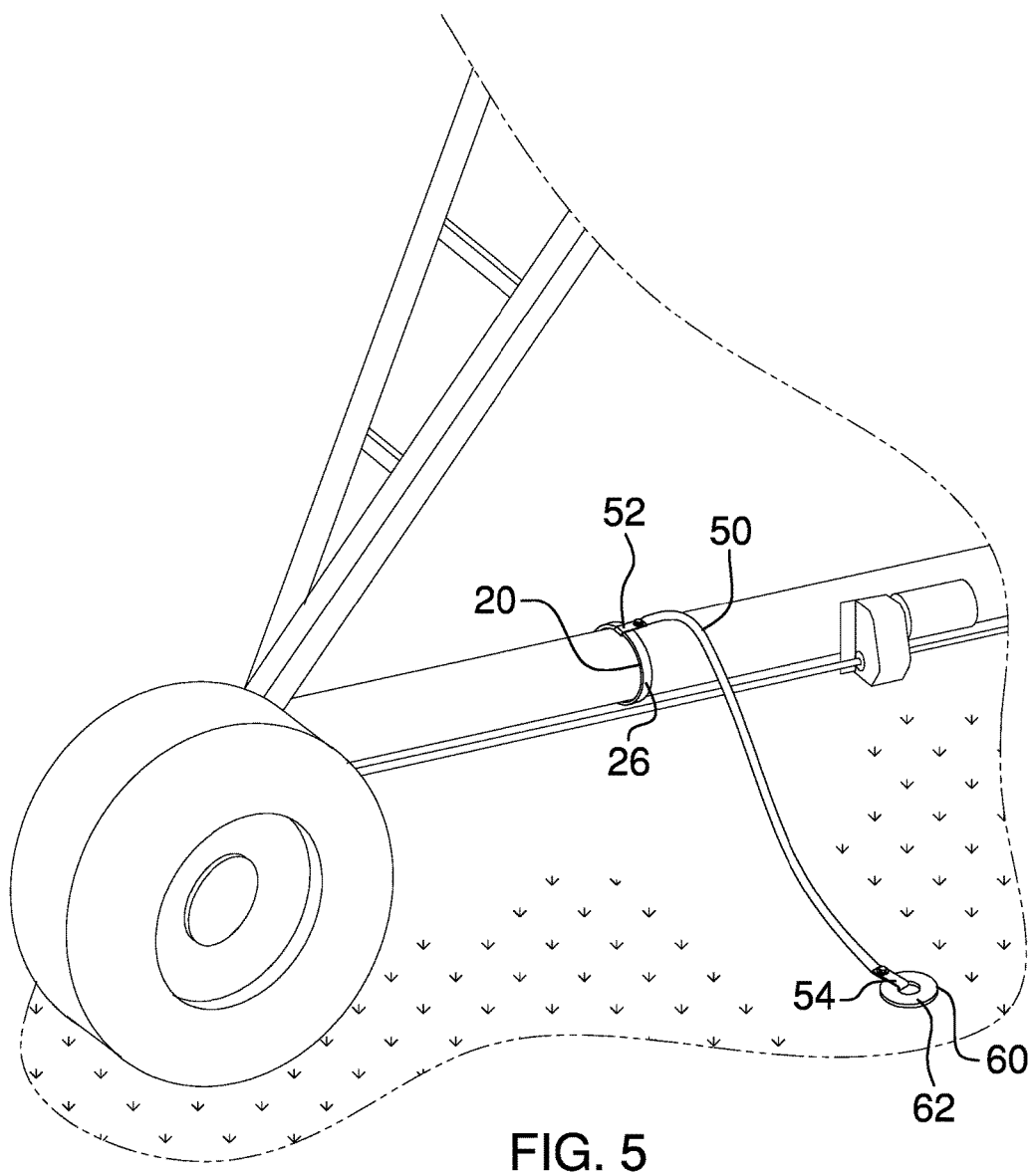
FIG. 5 is an in-use view showing a grounding strap attached to a wheel support lateral member of an end tower of an irrigation system.

With reference now to the drawings, and in particular FIGS. 1 through 5 thereof, an example of the instant irrigation system grounding strap employing the principles and concepts of the present irrigation system grounding strap and generally designated by the reference number 10 will be described.

Referring to FIGS. 1 through 5 the present irrigation system grounding strap 10 is illustrated. The irrigation system grounding strap 10 includes a length-adjustable lap-joint band clamp 20. The lap-joint band clamp 20 has a top side 22, a bottom side 24, an outer wall 26, and a pair of spaced apart outer loops 28 on a front end 30 of the outer wall 26. Each of the pair of outer loops 28 has an opening 32 extending from the top side 22 to the bottom side 24. The lap-joint band clamp 20 is configured to removably attach to the lateral wheel support member of the end tower of the center pivot irrigation system.

A pair of holder members 35 is provided with one of the pair of holder members being continuously disposed through the opening 32 of each of the outer loops 28. A first holder member 37 of the pair of holder members 35 is hour-glass shaped holder and has an aperture 39 transversely centrally disposed therethrough. A second holder member 38 of the pair of holder members 35 has an end cap 40 disposed thereon. A single adjustment screw 42 is insertable through the aperture 37 of the first holder member 37 and has an external end 43 securable within the end cap 40. A nut 45 engages the adjustment screw 40. The nut 45 is configured to tighten and loosen the adjustment screw 40 relative the first holder member 37 to shorten and alternately lengthen a distance between the holder members 35. Shortening and alternately lengthening the distance between the holder members 35, decreases and alternately increases a diameter of the lap-joint band clamp 20 to secure the lap-joint band clamp 20 to a lateral wheel support member of an end tower of a center pivot irrigation system.

A flat braided copper wire strap 50 is provided as an electrical conductor. The flat braided copper wire strap 50 has an upper loop 52 slidingly engaging the lap-joint band clamp 20 outer wall 26 and a lower loop 54. The strap 50 is formed of a flat braided copper wire because the flat braided strap has more surface area than a solid wire and has low Rf resistance and copper is a good conductor, all of which together results in a good conductor.

A ground body 60 is disposed on the lower loop 54. The ground body 60 is a flat annular washer 62 which is metal to provide a ground and is flat and annular to prevent the ground body 60 from being caught on the ground surface or on a plant during use. The strap 50 has a length between the lap-joint band clamp 20 on the lateral wheel support member and the ground body 60 sufficient to permit the ground body 60 to make contact with a ground surface on which the ground body 60 is disposed. The ground body 60 is configured to discharge an electric charge from a short-circuited electric end tower drive motor disposed on the lateral wheel support member of an end tower of a center pivot irrigation system.

What is claimed is:

1. An irrigation system grounding strap comprising:
   a deformable lap-joint band clamp having a top side, a bottom side, an outer wall, a pair of spaced apart outer loops on a front end of the outer wall, each of the pair of outer loops having an opening extending from the top side to the bottom side, a pair of holder members continuously disposed through the opening of each of the outer loops, a first holder member of the pair of holder members being hour-glass shaped and having an aperture transversely centrally disposed therethrough, a second holder member of the pair of holder members having an end cap disposed thereon, a single adjustment screw insertable through the aperture of the first holder member and having an external end securable within the end cap, a nut engaging the adjustment screw, the nut being configured to tighten and loosen the adjustment screw relative the first holder member to shorten and alternately lengthen a distance between the holder members, wherein shortening and alternately lengthening the distance between the holder members, decreases and alternately increases a diameter of the lap-joint band clamp;
   a flat braided copper wire strap having an upper loop sliding lay engaging the lap-joint band clamp outer wall and a lower loop; and
   a ground body disposed on the lower loop, the ground body being configured to discharge an electric charge from a short-circuited electric end tower drive motor disposed on the lateral wheel support member of an end tower of the irrigation system;
   wherein the lap-joint band clamp is configured to removably attach to the lateral wheel support member of the end tower of the irrigation system; and
   wherein the strap has a length between the lap-joint band clamp on the lateral wheel support member and the ground body sufficient to permit the ground body to make contact with a ground surface upon which the ground body is disposed.

2. The irrigation system grounding strap of claim 1 wherein the ground body is a flat annular washer.

3. An irrigation system grounding strap comprising:
   a deformable lap-joint band clamp having a top side, a bottom side, an outer wall, a pair of spaced apart outer loops on a front end of the outer wall, each loop having an opening extending from the top side to the bottom side, a pair of holder members continuously disposed through the opening of each of the outer loops, a first holder member of the pair of holder members being hour-glass shaped and having an aperture transversely centrally disposed therethrough, a second holder member of the pair of holder members having an end cap disposed thereon, a single adjustment screw insertable through the aperture of the first holder member and having an external end securable within the end cap, a nut engaging the adjustment screw, the nut being configured to tighten and loosen the adjustment screw relative the first holder member to shorten and alternately lengthen a distance between the holder members, wherein shortening and alternately lengthening the distance between the holder members, decreases and alternately increases a diameter of the lap-joint band clamp;
   a flat braided copper wire strap having an upper loop sliding lay engaging the lap-joint band clamp outer wall and a lower loop; and
   a ground body disposed on the lower loop, the ground body being a flat annual washer, the ground body being configured to discharge an electric charge from a short-circuited electric end tower drive motor disposed on the lateral wheel support member of an end tower of a center pivot irrigation system;
   wherein the lap-joint band clamp is configured to removably attach to the lateral wheel support member of the end tower of the center pivot irrigation system; and
   wherein the strap has a length between the lap-joint band clamp on the lateral wheel support member and the ground body sufficient to permit the ground body to make contact with a ground surface upon which the ground body is disposed.

* * * * *